July 5, 1960

J. L. GAFFORD 2,943,546

SHUTTERLESS CAMERA FOR TAKING PICTURES
OF THE WALL OF A WELL OR THE LIKE

Filed Dec. 29, 1955

INVENTOR,
John L. Gafford.
BY
Fishburn & Gold
ATTORNEYS.

July 5, 1960
J. L. GAFFORD
2,943,546
SHUTTERLESS CAMERA FOR TAKING PICTURES
OF THE WALL OF A WELL OR THE LIKE
Filed Dec. 29, 1955
2 Sheets-Sheet 2
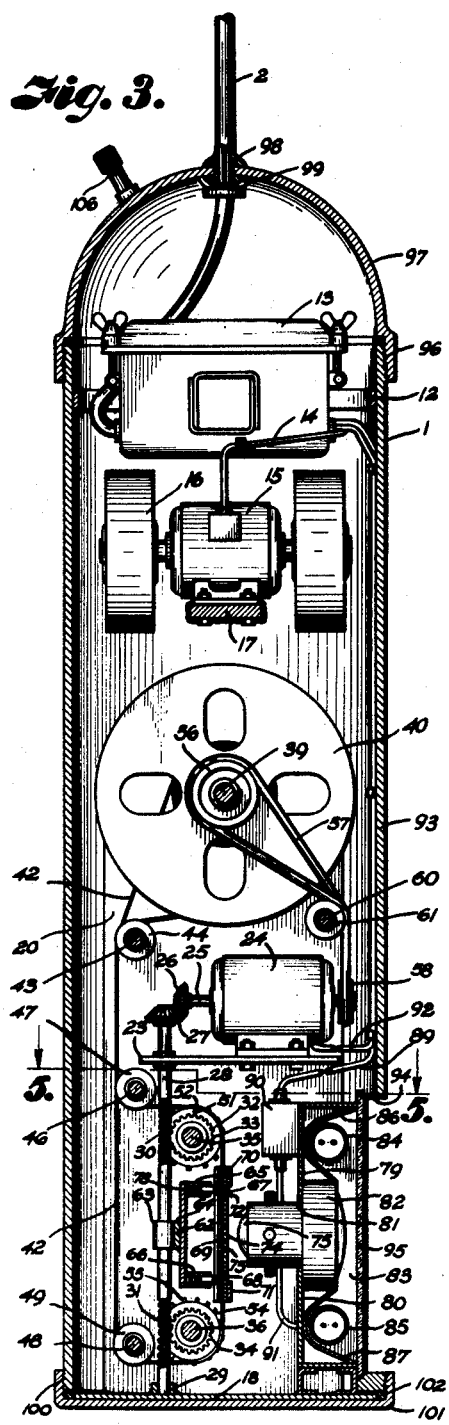
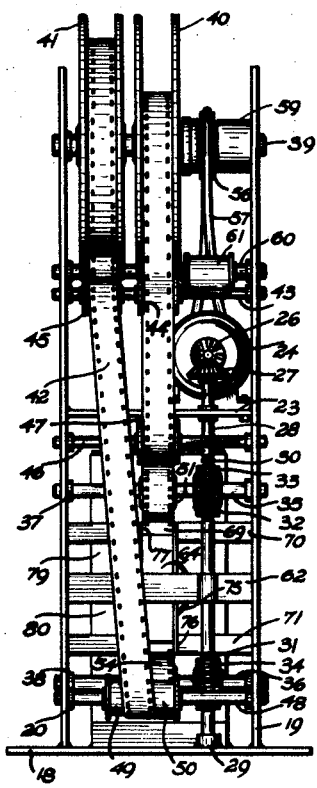
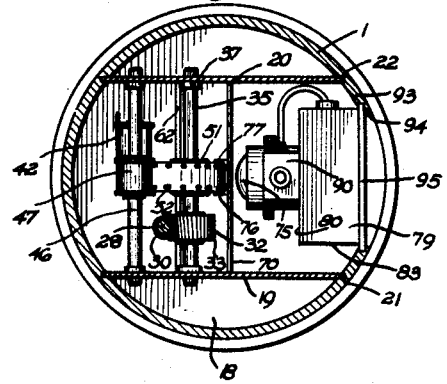
INVENTOR.
John L. Gafford.
BY
Fishburn and Gold
ATTORNEYS.

United States Patent Office 2,943,546
Patented July 5, 1960

2,943,546

SHUTTERLESS CAMERA FOR TAKING PICTURES OF THE WALL OF A WELL OR THE LIKE

John L. Gafford, 3535 Second, Riverside, Calif.

Filed Dec. 29, 1955, Ser. No. 556,323

2 Claims. (Cl. 95—11)

This invention relates to a constant velocity shutterless camera and more particularly to a camera intended to be used to obtain a photographic image of a plane surface which is in motion at a constant velocity with respect to the camera, the photographic image thus obtained being a stationary picture.

The principal object of the present invention is to obtain a photographic image of the wall face of a well, core hole, or other hole in the ground but the principle can be applied to any condition requiring a photograph of any constant, straight line motion. One novel feature of the invention lies in the fact that, although a state of parallel motion exists between the subject and the camera, the resultant picture is stationary.

Other objects of the present invention are to provide a camera consisting of a film, light source, lens and other features all contained in a case hermetically sealed under pressure with fittings at the top to accommodate a cable used to lower the camera into a well and carry the electrical power necessary to operate the device and with a fitting to admit inert gas such as nitrogen; to provide a capstan for lowering the camera into the well at a rate of speed exactly fifty times the speed that the film in the camera is passing the aperture plate of the camera; to provide cable reel means to accommodate a supply of cable for reeling the camera into the well hole; and to provide a power generator preferably mounted on a truck with the cable supply reel and used in connection with the capstan for lowering the camera into the well hole.

Further objects of the invention are to provide a gyroscope within the camera set with the axis of rotation at right angles to the long dimension of the camera for preventing rotation of the camera on its cable during its descent into the well; to provide the camera with a slit aperture and pressure plate wherein the slit will be adjustable in order to regulate the exposure and the slit will be at right angles to the direction of the film travel and in intimate contact with the film under the action of the pressure plate; to provide friction means for regulating pay of the film from the reels; to provide a port hole in the housing in alignment with the lens of the camera; and to provide a device of this character simple and economical to manufacture.

In accomplishing these and other objects of the present invention, I have provided improved details of structure, the preferred forms of which are illustrated in the accompanying drawings, wherein:

Fig. 3 is a vertical cross sectional view through the camera.

Fig. 4 is a side view of part of the camera in the housing and particularly illustrating the film mechanism.

Fig. 5 is a cross sectional view taken on the line 5—5, Fig. 3.

Figure 1:
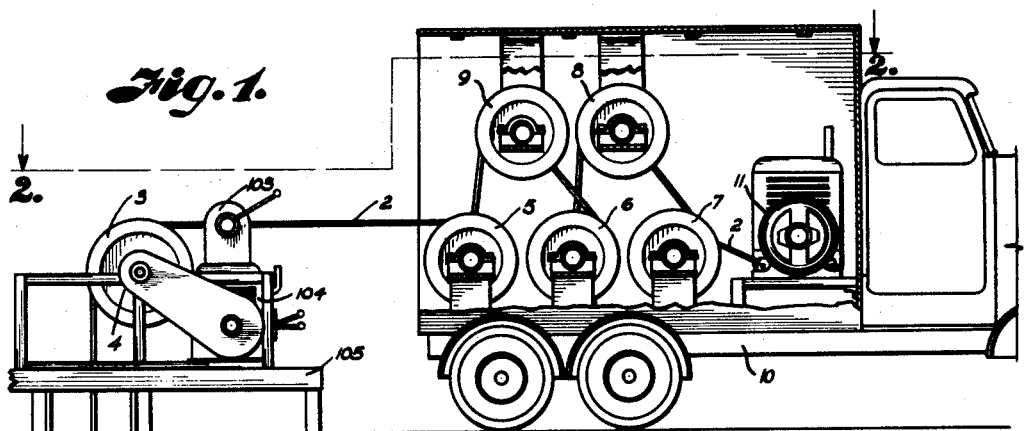
Fig. 1 is a side view of my apparatus showing the camera being lowered into a well hole.
Figure 2:
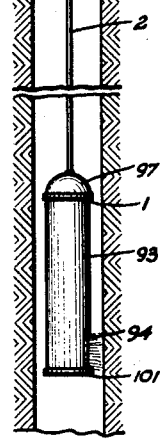
Fig. 2 is a cross sectional plan view taken on the line 2—2, Fig. 1.
Figure 2:
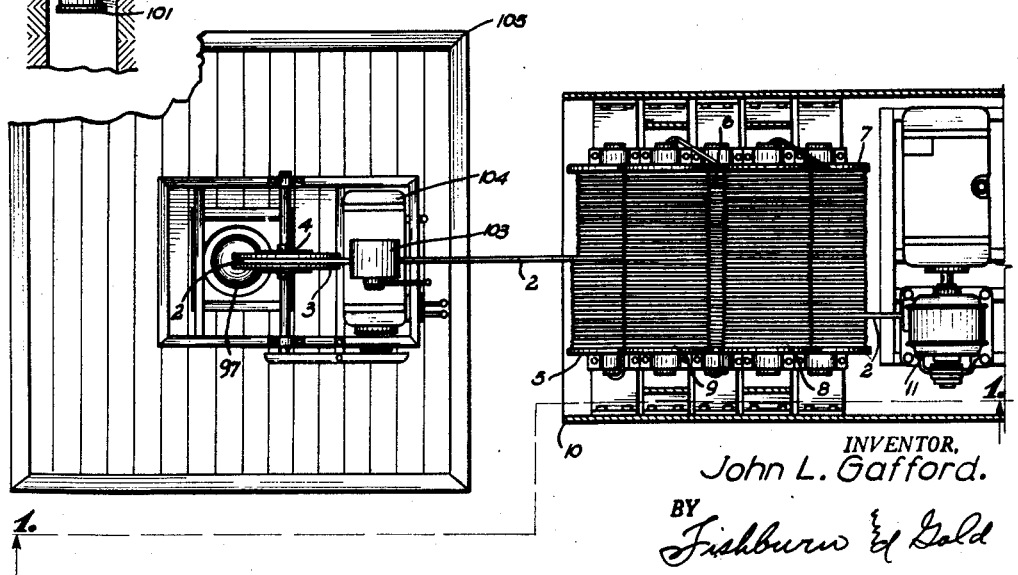

Referring more in detail to the drawings:

1 designates a casing or housing for the camera suspended by a cable 2 running over a pulley 3 of a capstan 4 to a plurality of cable supply reels, as indicated at 5, 6, 7, 8 and 9, set upon a vehicle 10, also carrying a power generator 11.

Mounted within the camera housing 1 by brackets or the like 12 is a power transformer 13 to which the cable 2 is connected, and the transformer also has a connection 14 with a motor 15 of a gyroscope 16 mounted by a bracket 17 in the housing below the transformer. Adapted to fit in the bottom cap of the housing 1 is a plate 18 and rigidly mounted thereon are spaced frame plates 19 and 20, the side edges of which engage in grooves 21 and 22 in the side walls of the housing forming a framework for mounting the mechanism now to be described.

Mounted on a plate 23 within the frame plates is a synchronous film drive motor 24 having a shaft 25 on the end of which is beveled gear 26 meshing with a beveled gear 27 on a vertical shaft 28 and having its lower end fitting in a bushing 29 on the plate 18 of the frame. The upper end of the vertical shaft 28 extends through and is supported by the plate 23. Spaced upon the vertical shaft 28 are worm threads 30 and 31 adapted to engage teeth 32 of gears 33 and 34 mounted upon shafts 35 and 36 engaging in the frame plates 19 and 20, as indicated at 37 and 38.

Mounted in the upper portion of the frame plates below the gyroscope is a shaft 39 upon which is mounted a pair of film spools or reels 40 and 41 for receiving the film 42. A shaft 43 is mounted in the frame slightly below the periphery of the film reels 40 and 41 upon which are mounted film guide rollers 44 and 45.

A shaft 46 is mounted in the frame and extends thereacross slightly above the shaft 35 upon which is mounted a roller 47 over which the film 42 passes. A similar shaft 48 is mounted in the lower portion of the frame upon which is mounted a film guide roller 49 having a wide surface 50 around which the film 42 is adapted to run and providing for alignment of the film to the roller 45 and thence to spool 41, as best illustrated in Fig. 4. Also mounted upon the shaft 35 is a sprocket 51 having teeth 52 for engaging openings 53 along the side edges of the film 42. A similar sprocket 54 is mounted upon the shaft 36 which also has teeth 55 for engaging the openings in the film 42.

Mounted upon the shaft 39 is a wheel or pulley 56 for receiving a belt 57 for engaging a wheel 58 mounted upon the shaft 25 of the motor 24, as best illustrated in Fig. 3. Connected with the pulley 56 is a friction drive mechanism, as indicated at 59, which may be selected to drive either film spool 40 or 41 and drive either spool at a speed commensurate with rotation of the sprockets 51 and 54, and for keeping the film 42 under necessary tension. Also mounted upon a shaft 60 carried by the frame plates 19 and 20 is an idler pulley 61 in substantial alignment with the wheel 58 whereby the motor will operate the belt in one direction and by turning the belt over the action will be reversed to drive the film in the opposite direction.

Secured to the frame plates 19 and 20 intermediate the shafts 35 and 36 is a bracket 62 having a sleeve member 63 welded to its outer side through which the vertical shaft 28 extends, forming an additional support therefor. Fastened to the inner side of the bracket 62 by welding or the like is a vertical plate member 64 and attached to its upper and lower sides thereof are tubular members 65 and 66 adapted to receive extensions 67 and 68 of a pressure plate 69. Mounted upon brackets 70 and 71, which are also secured to the frame plates 19 and 20, opposite the pressure plate 69 is an aperture plate 72. The aperture plate 72 consists of a vertical plate 73 approximately the same size as the pressure plate 69, having a slit 74 exactly opposite a lens 75 and vertical flanges or guides 76 and 77. Inside the tubular members 65 and 66 are springs 78 whereby when the extensions 67 and 68 of the pressure plate 69 are inserted into the cylindrical members, the springs 78 will bear against the extensions 67 and 68 and force the pressure plate towards the aperture plate 72 between the flanges or guides 76 and 77. The film 42 which runs between the aperture plate 72 and pressure plate 69 and between the flanges 76 and 77 will thereby be pressed against the aperture plate and pass the slit 74 opposite the lens 75 which is of wide angle type with a fifty-to-one reduction ratio and a depth of field from about three and seven-eights inches and of anastigmat type. It is also fully color corrected. The aperture is adjustable to regulate the exposure and the slit will be at right angles to the direction of the film and will be in intimate contact with the film under the action of the pressure plate.

A light chamber 79 is mounted on the plate 18 and its rear wall 80 has an opening 81 in which the lens 75 is mounted, the wide-angle portion 82 of the lens being within the chamber. The chamber 79 also has side walls, as indicated at 83. Mounted within the chamber 79 are light sources, as indicated at 84 and 85 of high-voltage, high-intensity lamps, such as is used on medical cameras, and reflectors are provided for the lamps, as indicated at 86 and 87.

An electric circuit 89 extends from the transformer 13 to a transformer 90 secured to the wall 80 of the chamber 79 and has a connection with the light source 84, and also a line 91 extends from the transformer 90 to the light source 85. An electric circuit 92 leads from the transformer 13 to the motor 24 for energizing said motor. The electric circuits 89 and 92 are of sufficient length to permit all the mechanism on the plate 18 to be withdrawn from the case 1.

The side wall 93 of the housing 1 is cut out, as indicated at 94. Mounted in the cut out portion is a transparent plate 95, such as glass or the like, to provide a covering for the lens portion 82 providing a port hole for full view of the wall of the well hole to the camera. The plate 95 will be sealed to withstand the pressure within the case 1.

The housing 1 is threaded at its upper end, as indicated at 96, and is adapted to receive a threaded cap 97 having an opening 98 in the top for receiving the cable 2 and is sealed therein by a sealing member 99. Also contained in the cap 97 is a fitting 106 for admitting or relieving the inert gas to or from the case. The bottom of the housing 1 is also threaded, as indicated at 100, and is closed by threaded cap member 101 and sealed by a rubber gasket or the like 102. From the foregoing it will be noted the frame plates with the mechanism mounted thereon may be removed through the bottom of the housing by removal of the cap 97 for repair or replacement of film or parts.

The pulley 3 of the capstan is provided with a friction brake 103 and is driven by a synchronous motor 104 provided with gears (not shown) but designed in such a manner to lower the camera into the well at a rate of speed exactly fifty times the speed that the film in the camera is moved past the aperture plate 72, the capstan being placed directly over the well and mounted upon the platform 105 of a derrick floor, as is the usual practice, or may be transportable by the use of wheels (not shown) for mounting the capstan.

The cable supply reels, 5, 6, 7, 8 and 9, are provided with commutators to accommodate the high voltage supplied by the generator and a motor clutch arrangement (not shown) for raising the camera out of the well when the exposures have been made. The power generator 11 is of high voltage alternating current properly insulated for the protection of operating personnel and insurance against ignition of combustible gases or other substance which may be present.

The cable 2 should be of non-stretching capacity so that no error will occur in introducing the camera into the well at a speed relationship existing between the rate of descent and film speed. The gyroscope will eliminate rotation of the housing to which the cable is attached and shall be provided with out-rigger apparatus (not shown) for holding the camera straight in the well hole. If desired, a footage counter (not shown) may be mounted upon the derrick floor and attached to the capstan to determine the exact depth of the camera in the well hole at all times.

In operation of apparatus assembled as described, the capstan 7 is operated for lowering of the housing 1 with the camera mechanism therein into the well hole paying out of the cable 2 by operation of the motor of the capstan. At the same time the motor 24 of the camera will be energized through transformer 13 for movement of the film past the lens 75 and wide-angle lens 82 of the camera. The film 42 is wound on reel 40 and moved therefrom over roller 44, roller 47 and sprocket 51, and passes between the pressure plate 69 and aperture plate 72 and then over sprocket 54 around the roller 49 and runs in opposite direction over the roller 45 to reel 41. The film will pass the aperture 74 from top to bottom. The film, as it passes the aperture plate, will be driven at a rate of speed exactly one-fiftieth the speed at which the camera is lowered into the well. In other words, the capstan will be driven by the synchronous motor and gears to lower the camera at a rate of exactly fifty times the speed of the film in the camera. The gyroscope will be set with the axis of rotation at right angles to the long dimension of the camera (at right angles to the direction of descent) and its purpose will be to prevent the camera from rotating about the camera's long dimension as it is lowered into the well to assure that the picture will be of one wall of the well or hole.

Prior to placement of the camera in the well, I load the camera with one hundred feet of film, seal the housing containing the camera and pump a nitrogen gas or other similar substance therein to a suitable pressure.

If it is desired to reverse the direction of the taking of the film from bottom to top, the friction device 59 may be made to engage spool 40 instead of spool 41, and the direction of the drive motor 24 reversed by changing electrical connections to 24, and in this instance, the directions for operating the system would be reversed, starting the picture from the bottom of the hole and raising the camera therefrom at the same speed as above indicated.

While I have illustrated the apparatus for geological use, I do not wish to be limited to such use. As before stated, the apparatus can be used to obtain a photographic image of a plane surface which is in motion at a constant velocity with respect to the camera, the photographed image thus obtained being a stationary picture. The principle can be applied to taking pictures from the air, any constant straight line motion, such as a machine driven belt, or other similar conditions. It, of course, is adaptable for color film as well as black and white.

It will be noted that exposure of the film is controlled by the magnitude of the respective velocities of the movement of the cable and the film, the width of the slit aperture, and the intensity of the lights, which is controlled by the transformer and the bulbs employed.

The ratio of 50 to 1 between the speed of the film and the rate of descent of the camera was chosen for convenience. It should be noted that the ratio of these two speeds must agree with the magnification ratio of the lens assembly 75 and 82 and may be any such value as meets these requirements.

What I claim and desire to secure by Letters Patent is:

1. A housing for a shutterless camera having a film for photographing underground strata of a well hole and being adapted to be lowered into a well hole at a predetermined rate of speed and having a port hole having a transparent cover in the lower sidewall thereof and having a wall provided with an opening spaced from the sidewall of the housing forming with said port hole an enclosed chamber, continuous light means in said chamber, a lens in said opening for focusing an image at a point outside said chamber in the housing, a frame having spaced plates removably mounted in said housing, a shaft in the upper portion of the frame, reels for film spaced on said shaft, a vertical shaft rotatable in said frame, a bracket mounted in said frame having a sleeve through which the vertical shaft extends, a vertical plate in the housing spaced from the chamber wall and having a slit therein opposite the opening in the chamber wall, said lens focusing through said slit, a pressure plate on said bracket, resilient means urging said pressure plate into face to face engagement with the first-named plate, shafts mounted in said frame transversely of the housing, one below and one above said pressure plate, gears on said transverse shafts, sprockets on said transverse shafts having teeth for engaging said film, means on said vertical shaft cooperating with said gears for rotating the transverse shafts, and synchronous motor means having continuous driving connection with said film reels and with said vertical shaft whereby said film will move continuously off of one reel and downwardly between the apertured plate and the pressure plate and on to the other reel at a predetermined rate with respect to rate of descent of the camera housing and character of said lens to properly focus the image on the film.

2. A housing for a shutterless camera having a film for photographing underground strata of a well hole and being adapted to be lowered into a well hole at a predetermined rate of speed and having a port hole having a transparent cover in the lower sidewall thereof and having a wall provided with an opening with a lens secured in said opening spaced from the sidewall of the housing forming with said port hole an enclosed chamber with light means therein, film moving means including a frame having spaced plates removably mounted in said housing, a shaft in the upper portion of the frame, reels for said film spaced on said shaft, a vertical shaft rotatable in said frame, a bracket mounted in said frame having a sleeve through which the vertical shaft extends, a vertical plate in the housing spaced from the chamber wall and having a slit therein aligned with the opening in the chamber wall, a pressure plate on said bracket, resilient means urging said pressure plate into face to face engagement with the first-named plate, shafts mounted in said frame transversely of the housing, one below and one above said pressure plate, gears on said transverse shafts, sprockets on said transverse shafts having teeth for engaging said film, means on said vertical shaft cooperating with said gears for rotating the transverse shafts, synchronous motor means having continuous driving connection with said film reels and with said vertical shaft whereby said film will move continuously off of one reel and downwardly between the apertured plate and the pressure plate and on to the other reel at a predetermined rate with respect to rate of descent of the camera housing, and clutch means having friction connection with said film reels for compensating for speed of rotation of the reels as the film is payed therefrom.

References Cited in the file of this patent

UNITED STATES PATENTS

| | | |
|---|---|---|
| 1,122,104 | Gruen | Dec. 22, 1914 |
| 1,124,068 | Smitt | Jan. 5, 1915 |
| 1,959,141 | Sperry | May 15, 1934 |
| 2,019,059 | Sherman | Oct. 29, 1935 |
| 2,203,176 | Opocensky | June 4, 1940 |
| 2,338,991 | Arnold | Jan. 11, 1944 |
| 2,401,530 | Vought | June 4, 1946 |
| 2,633,783 | Laval | Apr. 7, 1953 |
| 2,737,864 | Gutterman et al. | Mar. 13, 1956 |